(12) United States Patent
Puskala et al.

(10) Patent No.: US 8,115,633 B2
(45) Date of Patent: Feb. 14, 2012

(54) TRACKING SYSTEM

(75) Inventors: Aapo Puskala, Helsinki (FI); Pekka Korhonen, Espoo (FI); Niko Rusanen, Helsinki (FI); Rauno Hatakka, Riihimäki (FI); Ari-Pekka Hietala, Vantaa (FI)

(73) Assignee: Kone Corporation, Helsinki (FI)

( * ) Notice: Subject to any disclaimer, the term of this patent is extended or adjusted under 35 U.S.C. 154(b) by 312 days.

(21) Appl. No.: 12/421,864

(22) Filed: Apr. 10, 2009

(65) Prior Publication Data

US 2009/0224873 A1 Sep. 10, 2009

Related U.S. Application Data

(63) Continuation of application No. PCT/FI2007/000234, filed on Sep. 20, 2007.

(30) Foreign Application Priority Data

Oct. 12, 2006 (FI) .................................... 20060906

(51) Int. Cl.
*G08B 13/14* (2006.01)
(52) U.S. Cl. ............... 340/572.1; 340/572.4; 340/572.7; 340/572.8; 340/568.5; 340/5.28; 340/5.31; 340/10.1; 235/382; 235/384; 235/385; 235/492
(58) Field of Classification Search ............... 340/572.1, 340/572.4, 572.7, 572.8, 568.5, 5.28, 5.31, 340/40.1; 235/382, 384, 385, 492
See application file for complete search history.

(56) References Cited

U.S. PATENT DOCUMENTS

| 5,051,741 | A | 9/1991 | Wesby | |
|---|---|---|---|---|
| 6,127,917 | A | 10/2000 | Tuttle | |
| 6,204,813 | B1 * | 3/2001 | Wadell et al. | 342/463 |
| 6,211,781 | B1 * | 4/2001 | McDonald | 340/505 |
| 6,232,877 | B1 | 5/2001 | Ashwin | |
| 7,568,629 | B2 * | 8/2009 | Lapstun et al. | 235/462.45 |
| 2004/0169587 | A1 | 9/2004 | Washington | |
| 2006/0001544 | A1 | 1/2006 | Siefke et al. | |

FOREIGN PATENT DOCUMENTS

| GB | 2 332 547 A | 6/1999 |
|---|---|---|
| JP | 2004-93423 A | 3/2004 |
| WO | WO-2006/005148 A2 | 1/2006 |

* cited by examiner

*Primary Examiner* — Tai T Nguyen
(74) *Attorney, Agent, or Firm* — Birch, Stewart, Kolasch & Birch, LLP (57) ABSTRACT

A method for tracking objects includes providing each of at least two different objects with a transmitter having individualized identifier data; logically connecting the objects to each other by connecting the identifier data of the transmitters to each other; recording the identifier data of the transmitters of the objects in a memory; connecting contact information of the object in question to the identifier data; detecting the transmitter of the object with a receiver of an identification point when the object comes close to the identification point; determining based on the identifier data contained in the memory whether at least two objects logically connected to each other have traveled past the identification point inside a pre-defined time window; and performing one or more pre-defined feedback actions when at least two of the objects logically connected to each other have not traveled past the identification point inside the pre-defined time window.

24 Claims, 3 Drawing Sheets

TRACKING SYSTEM

FIELD OF THE INVENTION

The present invention relates to the tracking of objects. More particularly, the object of the invention is a method and a system for tracking objects in a tracking system.

BACKGROUND OF THE INVENTION

As a consequence of the wireless transmission of information, it is nowadays possible to track and monitor people and goods in many different ways. Mobile phones can be located with a certain accuracy on the basis of the signals they transmit. If, on the other hand, a special-purpose locator appliance, e.g. a GPS locator, is in use, location can be performed very accurately.

The tracking of objects and goods is performed most often in a closed system inside a building, e.g. in a library, in a shop and in different warehouses. Transmitters or transmitter-receivers that are small in size can be connected to books, to boxes and to other objects. When a book, a box or another object to which a transmitter is affixed is conveyed through a special identification point, the identification point receives information from the object conveyed past the identification point. Transmitters or transmitter-receivers can be implemented with many different technologies. One prior-art technology uses radio-frequency remote identification (RFID, Radio Frequency Identification), i.e. an RFID identifier. An RFID identifier is a small device, which can be incorporated in a product in the manufacturing phase, or glued to it afterwards e.g. with a sticker. RFID identifiers contain an antenna in order to be able to transmit and receive radio frequency enquiries from an RFID transmitter-receiver. RFID identifiers can be either active, passive or semi-passive. Passive RFID identifiers do not have their own power source. The extremely small electrical current required for operation of the device is induced from the radio frequency scanning arriving in the antenna, by means of which the identifier is able to transmit a response. A semi-passive RFID identifier contains a power source, but not its own transmitter. With an inbuilt power source, however, a greater operating range than a passive identifier is achieved and extended functionality is enabled, including saving information in the identifier's own memory. Active RFID identifiers, for their part, contain a power source, and they can have a longer range, as well as a larger memory, than passive identifiers. They can also record additional information transmitted by a transmitter-receiver.

Prior-art remote identification solutions are related e.g. to the automated maintenance of warehouse inventories, intruder alarms, if a good provided with a remote identifier is conveyed past an identification point without proper payment, etc. In other words, prior-art solutions concentrate on tracking individual objects and on notifying the unauthorized taking of them and do not in any way take a stand on the grouping of different objects and on the movement rights of different objects contained in the group and on tracking mobility.

PURPOSE OF THE INVENTION

The purpose of the present invention is to eliminate or at least to alleviate the aforementioned technical problems of prior-art technology and to disclose a new kind of solution for tracking objects in a tracking system.

SUMMARY OF THE INVENTION

Some inventive embodiments are also presented in the drawings in the descriptive section of the present application. The inventive content in the application can also be defined differently than is done in the claims presented below. The inventive content may also consist of several separate inventions, especially if the invention is considered in the light of expressions or implicit sub-tasks or from the point of view of advantages or categories of advantages achieved. In this case, some of the attributes contained in the claims below may be superfluous from the point of view of separate inventive concepts. The features of the various embodiments can be applied within the scope of the basic inventive concept in conjunction with other embodiments.

In accordance with the first aspect of the invention, a method for tracking objects in a tracking system is presented. In the method at least two different objects are provided with a transmitter, in which each has individualized identifier data. Objects are logically connected to each other by connecting the identifier data of the transmitters to each other. In other words, a certain kind of group is formed of different objects. The object itself is e.g. a person, an animal, an electronic device, an item of clothing, a bag, a travel document, an article, a toy or any unit whatsoever to which the aforementioned transmitter can be affixed. The identifier data of the transmitters of objects that are logically connected to each other are recorded in the memory. The memory can be arranged in a separate tracking center, in a separate identification point or in the transmitter of the object itself. The transmitter of the object is detected with the receiver of the identification point, when the object passes the identification point. Identification points can be arranged in the desired locations, e.g. in the proximity of elevators, escalators or doors. On the basis of the data contained in the memory, it is determined whether at least two objects that are logically connected to each other have traveled past the identification point inside the pre-defined time window, and one or more pre-defined feedback actions are performed when two of the aforementioned objects that are logically connected to each other have not traveled past the identification point inside the pre-defined time window. A pre-defined feedback action refers e.g. to one or more of the following actions: information is conveyed from the identification point to the tracking center, visual and/or auditive feedback is presented in the identification point, a message is sent to the contact information connected to the identifier data of the transmitter of the object, a phone call is formed to the contact information connected to the identifier data of the transmitter of the object, information is stored in the identification point, the starting of the elevator car is prevented, and the exit passage is locked.

In accordance with the second aspect of the invention, a system for tracking objects in a tracking system is presented. The system comprises at least two transmitters, each of which has individualized identifier data. The system further comprises management means for logically connecting objects to each other by connecting the identifier data of the transmitters of objects to each other and for recording in memory the identifier data of the transmitters of the logically connected objects. The system further comprises at least one identification point, which comprises a receiver for detecting a transmitter when the aforementioned object passes the identification point. The system further comprises determination means, with which on the basis of the data contained in the memory it is determined whether at least two objects that are logically connected to each other have traveled past the identification point inside a pre-defined time window, and means for performing one or more pre-defined feedback actions when two of the aforementioned objects that are logically connected to each other have not traveled past the identification point inside the pre-defined time window.

In one embodiment of the invention one of the objects is defined as the host object.

In one embodiment of the invention a super-user is defined for the tracking system, in the company of whom an object is permitted to go past an identification point without a host object without performance of the aforementioned one or more pre-defined feedback actions.

In one embodiment of the invention the contact information of the object connected to the identifier data of the transmitter of the object is recorded in memory. This enables the sending of a message or the forming of a phone call as the aforementioned pre-defined feedback action.

In one embodiment of the invention the aforementioned memory is arranged in an identification point. Thus the aforementioned determination is performed on the basis of the identifier data that is pre-recorded in the memory of the identification point.

In one embodiment of the invention the aforementioned memory is arranged in the transmitter of the object. Thus the identification point is arranged to receive information about the identifier data, which are logically connected to each other, from the memory of the object.

In one embodiment of the invention the memory is a centralized memory of the tracking system, from where the identification point seeks the identifier data that are logically connected to each other on the basis of one or more identifier data. In another embodiment the identification point is arranged to convey the identifier data of a transmitter of an object to the tracking center and the tracking center is arranged to check the identifier data that are logically connected to each other from the centralized memory on the basis of one or more identifier data. In this embodiment the determination subject is performed in the tracking center.

In one embodiment of the invention the identification point is arranged to convey the identifier data of one or more objects and the identifier data that are logically connected to each other received from the transmitter to the tracking center. In this embodiment the determination means are arranged in the tracking center and they are arranged to determine on the basis of the data received from an identification point whether at least two objects that are logically connected to each other have traveled past the identification point inside the pre-defined time window.

In one embodiment of the invention the transmitter is a radio frequency remote identifier and/or a wireless short-range radio transmitter.

According to the third aspect of the invention an identification point for tracking objects is presented. The identification point comprises a receiver for detecting the transmitter of an object when the aforementioned object comes near the identification point and means, which are arranged to determine on the basis of the identifier data received from the transmitter of the object whether at least two of the objects indicated by the identifier data received have traveled past the identification point of the objects inside the pre-defined time window. The identification point further comprises feedback means or a connection to feedback means, for performing one or more pre-defined feedback actions, when at least two of the aforementioned objects that are logically connected to each other have not traveled past the identification point inside the pre-defined time window.

According to the fourth aspect of the invention an identification point for tracking objects is presented. The identification point comprises a receiver for detecting the transmitter of at least one object when the aforementioned object comes near the identification point and an interface to management means for connecting objects logically to each other by connecting the identifier data of the transmitters of the objects to each other. The identification point further comprises a memory for recording the identifier data of the transmitters of the objects that are logically connected to each other, determination means, with which on the basis of the data contained in the memory it is determined whether at least two objects that are logically connected to each other have traveled past the identification point inside the pre-defined time window, and feedback means or a connection to feedback means for performing one or more pre-defined feedback actions, when at least two objects that are logically connected to each other have not traveled past the identification point inside the pre-defined time window.

According to the fifth aspect of the invention an identification point for tracking objects is presented. The identification point comprises a receiver for detecting the transmitter of at least one object when the aforementioned object comes near the identification point, and an interface for conveying at least one identifier data received from a transmitter to a tracking center.

In one embodiment of the invention the identification point further comprises a memory for recording the identifier data of the transmitters of the objects that are logically connected to each other received from the tracking center. In one embodiment of the invention the identification point further comprises determination means, with which on the basis of the data contained in the memory it is determined whether at least two objects that are logically connected to each other have traveled past the identification point inside the pre-defined time window.

In one embodiment of the invention the identification point further comprises feedback means or a connection to feedback means, for performing one or more pre-defined feedback actions, when at least two of the aforementioned objects that are logically connected to each other have not traveled past the identification point inside the pre-defined time window.

According to the sixth aspect of the invention a tracking center for tracking objects is presented. The tracking center is arranged to receive the identifier data of the transmitter of an object from an identification point. The tracking center further comprises a memory, which is arranged to record the identifier data of the transmitters of at least two objects that are logically connected to each other, management means, which are arranged to connect objects logically to each other by connecting the identifier data of the transmitters of the objects to each other in the memory; determination means, which are arranged to determine on the basis of the data contained in the memory whether at least two objects that are logically connected to each other have traveled past the identification point inside the pre-defined time window, and feedback means or a connection to feedback means for performing one or more pre-defined feedback actions, when at least two objects that are logically connected to each other have not traveled past the identification point inside the pre-defined time window.

According to the seventh aspect of the invention a tracking center for tracking objects is presented. The tracking center is arranged to receive from an identification point identifier data that are logically connected to each other and that are recorded in the memory of a transmitter of an object, and the identification data of a transmitter of one or more objects. The tracking center further comprises management means, which are arranged to logically connect at least two objects to each other by connecting the identifier data of the transmitters of the objects to each other in the memory; determination means, which are arranged to determine on the basis of the data received from an identification point whether at least two objects that are logically connected to each other have traveled past the identification point inside the pre-defined time window; and feedback means or a connection to feedback means, which are arranged to perform one or more pre-defined feedback actions, when at least two of the aforementioned objects that are logically connected to each other have not traveled past the identification point inside the pre-defined time window.

As a result of the present invention the movement of objects can be monitored and if necessary also limited in the desired manner. According to the invention each object is provided with a separate transmitter, and each transmitter has unambiguous identifier data. The identifier data is categorized into different groups. By means of grouping it is possible e.g. to specify that a certain object may not move inside the building e.g. without a host object. As a result of the invention it is possible to e.g. prevent a child from getting lost outside a shopping center or a demented resident of a senior citizens' home from leaving the senior citizens' home without permission. In addition, owing to the invention the circulation of an object can be tracked and if necessary it is possible to give for the object e.g. a notification in the identification point of a missing good (because the missing good is logically connected to an object in the manner presented by the invention). By means of the invention it is further possible to prevent goods being taken, e.g. out of the building, without permission. The invention can also be utilized in the evacuation of buildings and similar premises e.g. such that the host object can verify that all the members of his/her group are evacuated from the premises to be evacuated.

LIST OF FIGURES

In the following, the invention will be described in detail by the aid of a few examples of its embodiments, wherein.

DETAILED DESCRIPTION OF THE INVENTION

In the following the meaning of certain terms used in this context is explained in more detail:

Time window: The term means the period of time during which the objects that are logically connected to each other (group) should travel past the identification point. A time window can be set for each group individually, or alternatively for all groups, to be able to use the same particular time window. The time window starts e.g. from when the identification point or the tracking center identifies the first of the particular objects that are logically connected to each other. Alternatively the time period of the time window is calculated starting from zero always when any object whatsoever of particular objects that are logically connected to each other is identified.

Feedback action: The term means a measure that is performed if one or more objects that are logically connected to each other do not travel past the identification point inside the pre-defined time window. A feedback action can be e.g. one or more of the following measures:
  information about the identification point is conveyed to the tracking center,
  visual and/or auditive feedback is presented in the identification point,
  a message is sent to the contact information connected to the identifier data of the transmitter of the object,
  a phone call is formed to the contact information connected to the identifier data of the transmitter of the object,
  the information is recorded in the identification point,
  the starting of the elevator car is prevented, and
  the exit passage is locked.

Object (206, 310, 410, 510): The term means an object, which is provided with a transmitter for sending identifier data to an identification point. The object can be e.g. a person, an animal, an electronic device, an item of clothing, a bag, a travel document, an article, a toy or any other object whatsoever that can carry a transmitter with it or to which a transmitter can be affixed.

Figure 1:
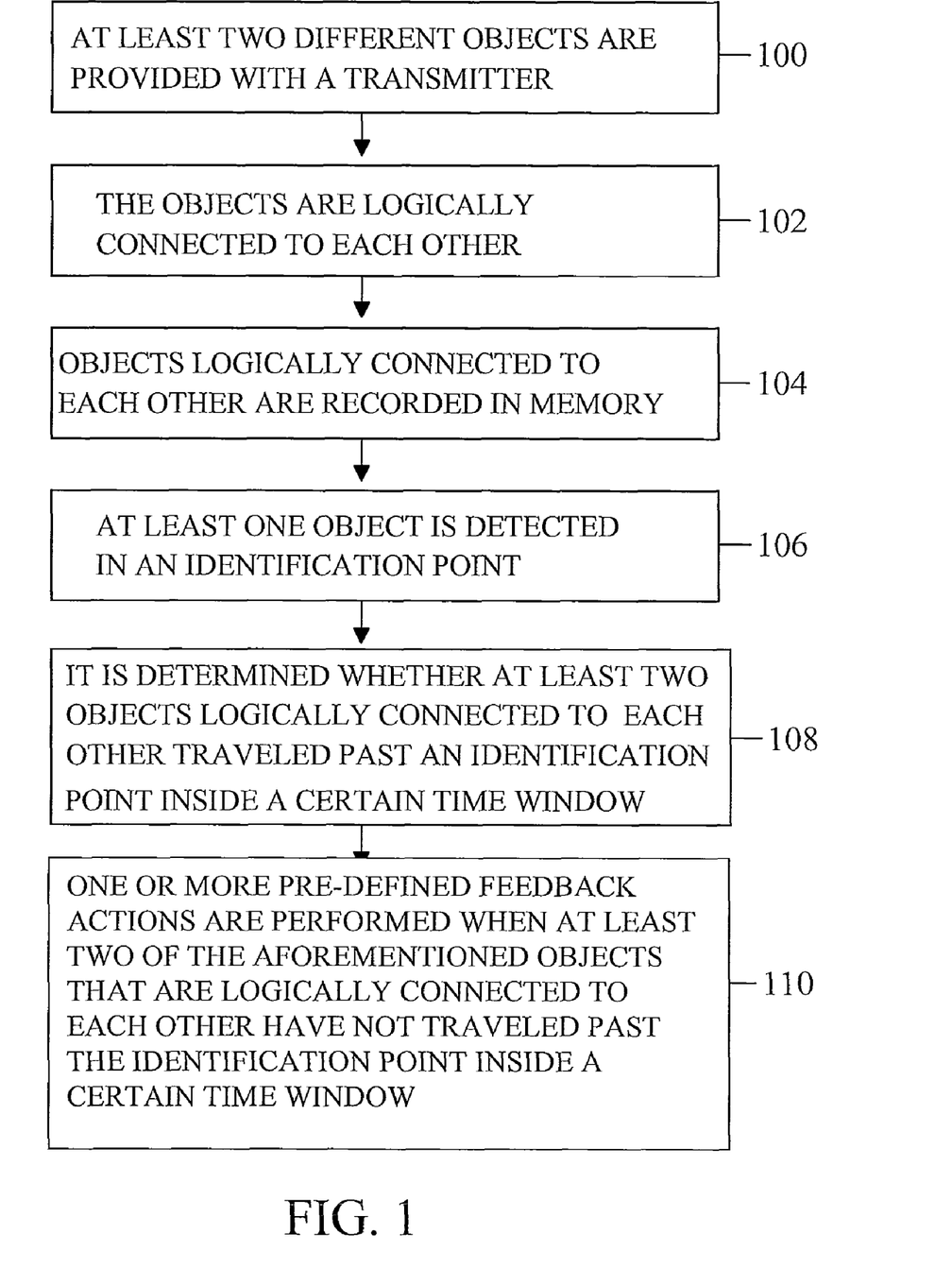
FIG. 1 presents one example of the method according to the invention.

FIG. 1 presents one example of the method according to the invention. The method can be used e.g. in the tracking of objects in a tracking system. The system according to the invention is preferably arranged such that tracking is performed only within a pre-defined area, e.g. inside one property, on one floor, inside a shopping center, inside one shop, inside an airport area, etc.

In the tracking system at least two different objects are provided with (100) a transmitter, and each transmitter has unambiguous identifier data. The transmitter is e.g. a transmitter that uses radio frequency remote identification technology, such as e.g. RFID technology. Each transmitter incorporates its own identifier data, which in an identification event the transmitter sends onwards. For example, in the case of RFID technology the extremely small electrical current required for transmission is induced from the radio frequency scanning arriving in the antenna, by means of which the identifier is able to transmit a response. It is obvious to the person skilled in the art that instead of RFID technology it is possible to use any other remote identification method whatsoever.

Figure 2:
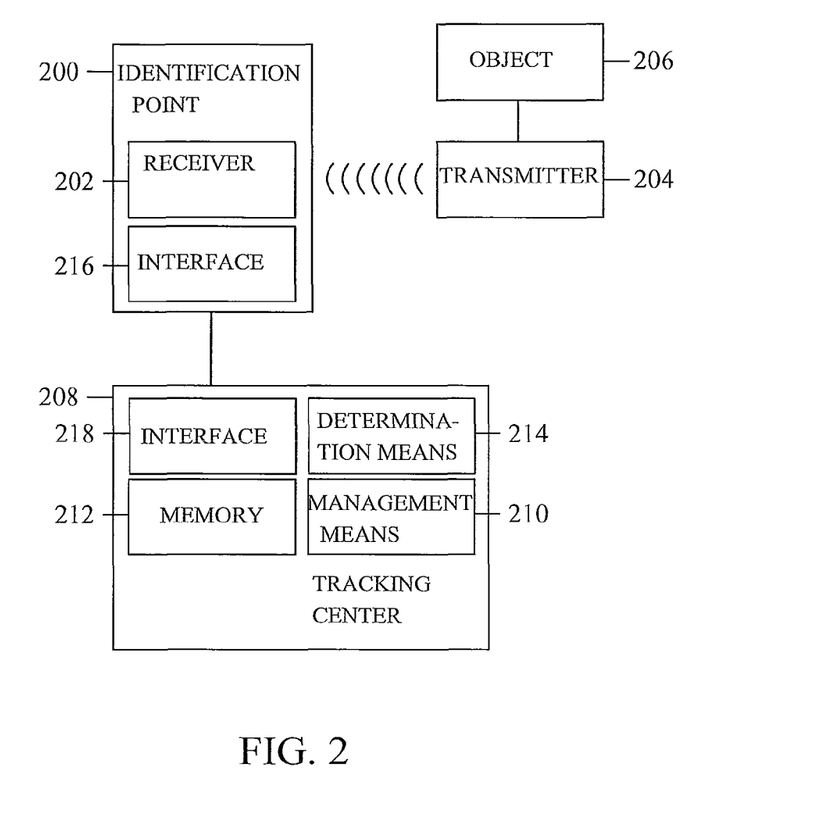
FIG. 2 presents a first example of the system according to the invention.
Figure 3:
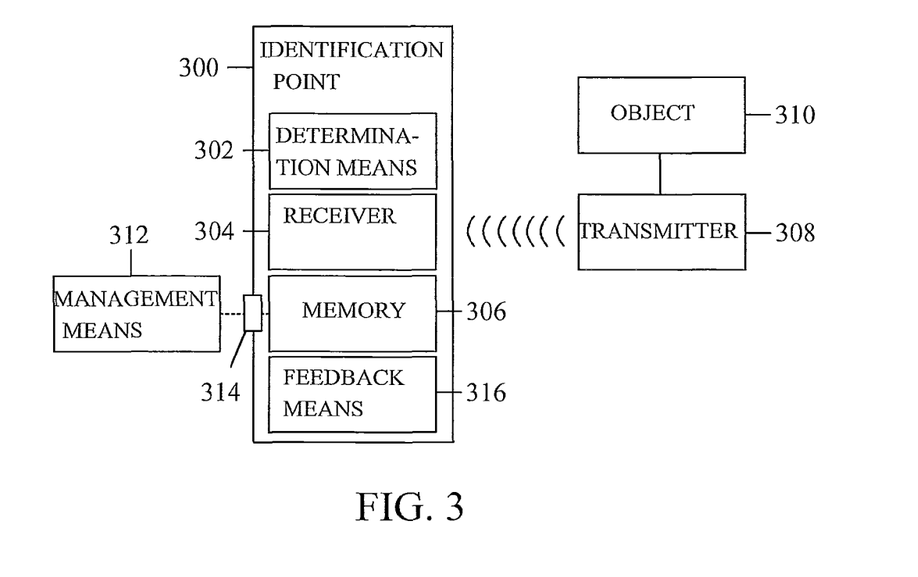
FIG. 3 presents a second example of the system according to the invention.
Figure 4:
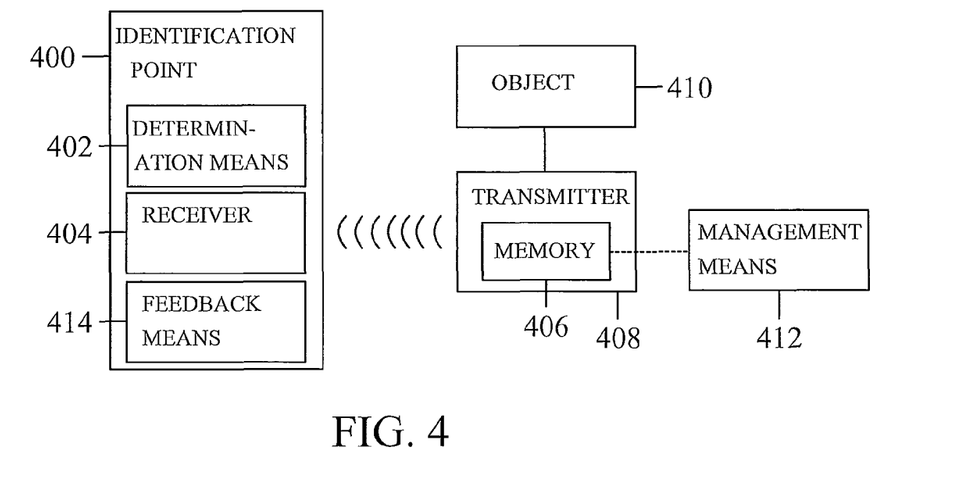
FIG. 4 presents a third example of the system according to the present invention.

The objects are logically connected (102) to each other by connecting the identifier data of the transmitters to each other. Connecting logically to each other refers preferably to objects that are connected to each other forming one object entity or group. In one embodiment one object can be a member of only one object entity. The identifier data that are logically connected to each other of the transmitters of the objects are recorded (104) in memory. Depending on the embodiment of the invention, the memory can be either in the transmitter itself, in a separate identification point or in a separate tracking center of the tracking system. FIGS. 2-4 present the different embodiment alternatives in more detail.

When an object comes near an identification point, the receiver of the identification point detects (106) the object and receives the response sent by the transmitter. Depending on the embodiment of the invention the transmitter of the object sends the identifier data of either one or more objects to the identification point. In other words, the transmitter of the object sends to the identification point either only its own identifier data or alternatively in addition to its own identifier data also other identifier data of the transmitters of the objects that are logically connected together. The transmitter can send to the identification point also other data in addition to the identifier data. FIGS. 2-4 present the different embodiment alternatives in more detail.

In phase 108 it is determined on the basis of the data contained in the memory whether at least two objects that are logically connected to each other have traveled past the identification point inside the pre-defined time window. The memory can be disposed e.g. in the object itself, in an identification point or in a separate database, to which a connection is arranged from the identification point.

In phase 110 one or more pre-defined feedback actions are performed when at least two of the aforementioned objects that are logically connected to each other have not traveled past the identification point inside a certain time window.

FIG. 2 presents a first example of the system according to the present invention. The system presented in FIG. 2 comprises an object 206, which carries with it a transmitter 204 or to which a transmitter 206 is affixed. The system further comprises an identification point 200, which is in wireless connection with the transmitter 204 of the object 206, and a tracking center 208. Although only one object is presented in FIG. 2, in practice there are however many objects. Each transmitter 204 has individualized identifier data. The transmitter 204 is preferably a transmitter that is used in radio frequency remote identification, such as e.g. an RFID identifier.

In this example at least two objects are logically connected to each other with the management means 210 of the tracking center 208 by connecting the identifier data of the corresponding transmitters to each other. In other words a certain kind of group is formed from two or more transmitters (i.e. objects). The definitions of the groups are stored in the memory 212 of the tracking center 208. The memory 212 can also be outside the tracking center 208, e.g. as an external database.

When the transmitter 204 comes into the reception area of the receiver 202, the radio frequency scanning of the receiver 202 induces a small electric current in the transmitter 204. By means of the induced electrical current the transmitter 204 is able to send to the receiver 202 its own individualized identifier data and thus at the same time to identify the object to which the transmitter 204 is affixed. The identification point 200 can send each of the identifier data it receives to the tracking center 208 via the interface 216. Correspondingly, the tracking center 208 comprises an interface 218 for receiving data from the identification point 200. The connection between the identification point 200 and the tracking center 208 can be implemented with any wired or wireless connection whatsoever that is suited to the purpose. A plurality of individualized identifier data of the transmitters is recorded in the memory 212 of the tracking center. At least two objects are logically connected to each other with the management means 210 by connecting the identifier data of the corresponding transmitters to each other in the memory. The determination means 214 determine, on the basis of the identifier data recorded in the memory 212, whether all or at least a part of the objects that are logically connected to each other have traveled past the identification point 200 inside the pre-defined time window. If the identification point 200 does not send to the tracking center 208 all or at least a part of the identifier data contained in a certain group inside the aforementioned time window, the tracking center 208 is arranged to perform one or more pre-defined feedback actions.

In FIG. 2 it is shown that the memory 212 is wholly arranged in the tracking center 208. In another embodiment of the invention, when the receiver 202 receives one individualized identifier data, the identification point 200 requests from the tracking center 208 information about the other identifier data connected to the identifier data received (i.e. about the identifier data of the other objects of the group). In this embodiment the identification point 200 is able after this to determine itself whether all the identifier data (i.e. objects) of the group have traveled past the identification point 200 inside the aforementioned time window. In this case in this embodiment the identification point 200 keeps inside it the determination means 214. If only one part of the objects that belong to a group travel past the identification point 200 inside the time window, the identification point 200 can convey information about this to the tracking center 208, which executes one or more of the aforementioned feedback actions. In one embodiment also the identification point 200 can perform one or more feedback actions, if all the identifier data (i.e. objects) of the group have not traveled past the identification point 200 inside the aforementioned time window. The actions are very different, depending on the practical application. According to FIG. 2 different feedback means can also be arranged in the system, which are controlled via either an identification point or a tracking center. One example of this kind of feedback means is a display panel.

The system presented in FIG. 2 can be arranged in a shop, a shopping center, a hospital, a senior citizen's home, an office, a library or the like. The underlying idea of the embodiment of the invention presented in FIG. 2 is that one or some of the aforementioned feedback actions are always performed when one or more of the objects connected to the same group travel past the identification point sufficiently apart from each other in terms of time, or do not travel past the identification point at all. In the system presented in FIG. 2 one or more of the objects of a group can be set as the host object. In this case it is possible to implement a system in which the other objects of the group are able to move without performance of the aforementioned pre-defined feedback actions only when with the host object. In some situations it can be a large group led by the host, in which case passage into the elevator or through doors can last some time. In this kind of situation the system can be configured e.g. such that the time window is kept zeroed (not activated) until the host is at the identification point. When the host moves away from the identification point, the counting of time can be started.

In one embodiment of FIG. 2 it is possible to define exceptions and alternatives in the memory 212 to which objects of a certain group must all travel past the identification point inside a certain time window. In a shopping center, for example, a mother, a father and a child can each be given their own transmitter and they can be connected into one group. It is also possible to define in the memory 212 that when a child passes an identification point it is sufficient that at least one of the parents travels past the identification point inside a certain time window, and that in this kind of case it is not necessary to perform any pre-defined feedback action.

In one embodiment of FIG. 2 a "main memory" 212 of the identifier data and of the groups formed from them is maintained in the tracking center. It is possible to divide the data recorded in the main memory into each memory incorporated in an identification point 200. In this way each identification point 200 always has real-time information about the prevailing group situation and it is able to independently perform the determination phase presented above.

FIG. 3 presents another example of the system according to the invention. The system presented in FIG. 3 comprises an object 310, which carries with it a transmitter 308 or to which a transmitter 308 is affixed. The system further comprises an identification point 300, which is in wireless connection with the transmitter 310 of the object 308. Although only one object is presented in FIG. 3, in practice however there are many objects.

In the system according to FIG. 3 at least two objects 310 are provided with their own transmitter 308. Each of the transmitters 308 has individualized identifier data. The transmitter 308 is preferably a transmitter that is used in radio frequency remote identification, such as e.g. a transmitter based on RFID technology. In this example at least two objects are logically connected to each other via the interface 314 with the management means 312 by connecting the identifier data of the corresponding transmitters to each other. In other words a certain kind of group is formed from two or more transmitters (or objects). Information about the connection is recorded in the memory 306 of the identification point. Management means 312 refers to e.g. a computer, which is provided with a suitable program for recording identifier data and any additional information related to the identifier data.

When the transmitter 308 comes into the reception area of the receiver 304, the receiver receives the individualized identifier data sent by the transmitter 308, which identifies the object to which the transmitter 308 is affixed. With the determination means 302 of the identification point 300 it is determined, on the basis of the identifier data recorded in the memory 306, whether all the objects that are logically connected to each other have traveled past the identification point 300 inside the pre-defined time window. If all the objects that are logically connected to each other have not traveled past the identification point 300 inside the aforementioned time window, the identification point 300 is arranged to perform one or more pre-defined feedback actions by means of the feedback means 316. Although FIG. 3 shows that the feedback means 316 are implemented in an identification point 300, in another embodiment the feedback means 316 can be separate from the identification point 300, and the identification point 300 only controls the operation of the feedback means 316.

In one embodiment of FIG. 3 it is possible to define exceptions and alternatives in the memory 306 to which objects of a certain group must at least all travel past the identification point inside a certain time window without the performance of one or more of the aforementioned feedback actions.

FIG. 4 presents a third example of the system according to the invention. The system presented in FIG. 4 comprises an object 410, which carries along with it a transmitter 408 or to which a transmitter 408 is affixed. The system further comprises an identification point 400, which is in wireless connection with the transmitter 408 of the object 410. Although only one object is presented in FIG. 4, in practice however there are many objects.

In the system according to FIG. 4 at least two objects 410 are provided with a transmitter 408, each of which has individualized identifier data. The transmitter 408 is preferably a transmitter that is used in radio frequency remote identification. In this example at least two objects are logically connected to each other with the management means 412 by connecting the identifier data of the corresponding transmitters to each other. In other words a certain kind of group is formed from two or more transmitters (or objects). Information about the connection is recorded in the memory 406 of the transmitter 408. Management means 412 refers to e.g. a computer, which is provided with a suitable program and with other necessary appliances for recording identifier data and any additional information related to the identifier data in the memory 406.

When the transmitter 408 comes into the reception area of the receiver 404, the receiver receives the individualized identifier data sent by the transmitter 408 as well as the identifier data of the transmitters of the other objects defined as being in the same group. With the determination means 400 of the identification point 402 it is determined, on the basis of the identifier data and any additional related information received from the transmitter 408, whether all the objects that are logically connected to each other have traveled past the identification point 400 inside the pre-defined time window. If all the objects that are logically connected to each other have not traveled past the identification point 400 inside the aforementioned time window, the identification point 400 is arranged to perform one or more pre-defined feedback actions by means of the feedback means 414. Although FIG. 4 shows that the feedback means 414 are implemented in an identification point 400, in another embodiment the feedback means 414 can be separate from the identification point 400, and the identification point 400 only controls the operation of the feedback means 414.

In one embodiment of FIG. 4 it is possible to define exceptions and alternatives in the memory 406 to which objects of a certain group must at least all travel past the identification point inside a certain time window without the performance of one or more of the aforementioned feedback actions. Information about these exceptions or alternatives can be sent as the aforementioned additional information to the receiver 404 in conjunction with the sending of identifier data.

Figure 5:
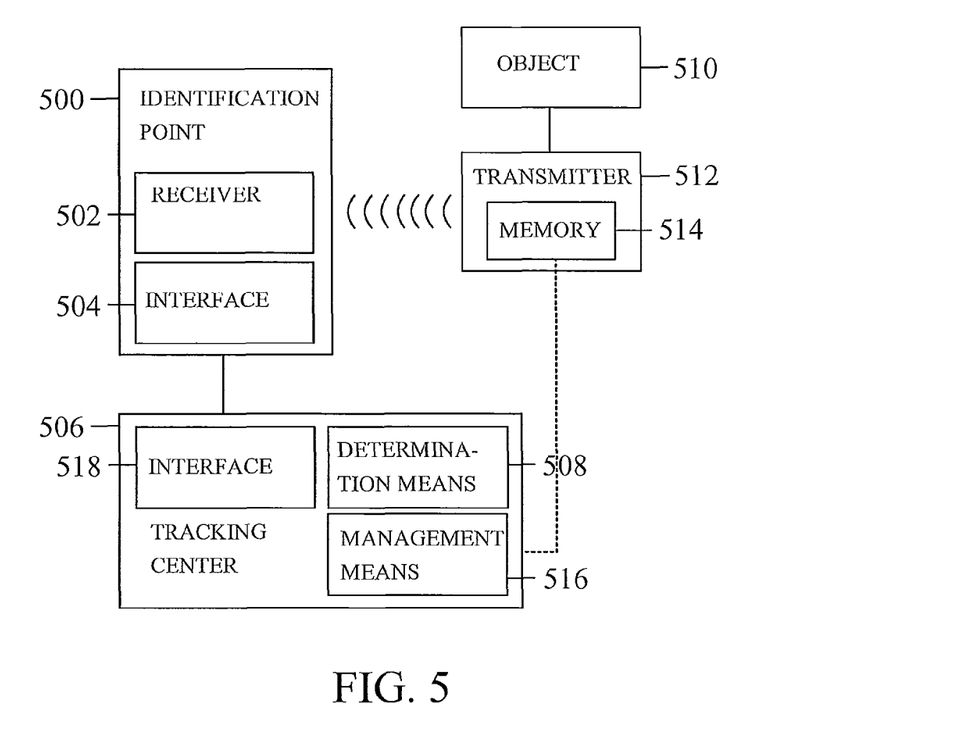
FIG. 5 presents a fourth example of the system according to the present invention.

FIG. 5 presents a combination of the systems presented in FIGS. 2 and 4. The system presented in FIG. 5 comprises an object 510, which carries along with it a transmitter 512 or to which a transmitter 512 is affixed. The system further comprises an identification point 500, which is in wireless connection with the transmitter 512 of the object 510. Although only one object is presented in FIG. 5, in practice however there are many objects. The system of the figure additionally comprises a tracking center 506 that is in connection with an identification point 500.

In the system according to FIG. 5 at least two objects 510 are provided with a transmitter 512. Each transmitter 512 has individualized identifier data. The transmitter 512 is preferably a transmitter that is used in radio frequency remote identification, e.g. an RFID identifier. In this example at least two objects are logically connected to each other with the management means 516 of the tracking center 506 by connecting the identifier data of the corresponding transmitters to each other. Information about the connection is recorded in the memory 514 of the transmitter 512. Management means 516 refers to e.g. a computer, which is provided with a suitable program and with other necessary appliances for recording identifier data and any additional information related to the identifier data in the memory 514.

When the transmitter 512 comes into the reception area of the receiver 502 of the identification point 500, the receiver receives the individualized identifier data sent from the transmitter 512 as well as the identifier data of the transmitters of the other objects defined as being in the same group. The identification point 500 conveys identifier data via the interface 504 to the tracking center 506 via the interface 504, and the tracking center 506 determines with the determination means 508, on the basis of the identifier data and any additional information, whether all the objects that are logically connected to each other have traveled past the identification point 500 inside the pre-defined time window. If all the objects that are logically connected to each other have not traveled past the identification point 500 inside the pre-defined time window, the tracking center 506 and/or the identification point 500 is arranged to perform one or more pre-defined feedback actions. Different feedback means can also be arranged in the system according to FIG. 5, with which it is possible to perform the aforementioned feedback action and which are controlled via either an identification point 500 or via a tracking center 506.

In one embodiment of FIG. 5 it is possible to define exceptions and alternatives in the memory 514 to which objects of a certain group must at least all travel past the identification point inside a certain time window without the performance of one or more of the aforementioned feedback actions. Information about these exceptions or alternatives can be sent as the aforementioned additional information to the receiver 502 in conjunction with the sending of identifier data.

In one embodiment of the invention the parents and a child receive for themselves from the information point of a shopping center stickers containing a transmitter, which can be affixed to their clothes. In conjunction with this the mother and/or the father give to the information point their own mobile phone number(s), and the phone number or phone numbers are connected to the identifier data of the transmitter of the mother and/or father. It is possible that at some stage the parents and the child become separated from each other in the shopping center and the child may even exit alone and unnoticed from the outer doors of the shopping center. In the solution according to the invention the aforementioned identification point is arranged in a suitable place in the proximity of the doors. The identification point can be a gate, via which exit from the shopping center is arranged. In another embodiment the identification point is implemented unobtrusively, e.g. in connection with the doors.

When the child comes close to the identification point, the identifier data of the transmitter affixed to the child is conveyed via the identification point to the tracking center of the shopping center. If in addition the identifier connected to the transmitter of the mother or of the father is not received within a certain period of time (e.g. 5 s) when the child passes an identification point, a message can be automatically sent to the mobile phone of the mother or of the father, which indicates the time and the place from which the child traveled out of the shopping center. It is also possible to form a phone call to a phone number from the tracking center instead of a text message or another similar message. If so desired, it can also be ensured that a child is not in general able to leave the shopping center alone in the aforementioned case. In one embodiment of the invention the exit is locked or closed before the child travels outside the shopping center. In another embodiment of the invention the tracking center can request the nearest guard of the shopping center to stop the child from leaving the shopping center. In one embodiment of the invention the identification point is arranged in a shopping center, e.g. in connection with a public meeting place. When the identification point detects a child on his/her own at the meeting point, it is possible to inform the mother/father or both, e.g. by phone, or to automatically send a message about the location of the child.

In one embodiment of the invention the host employee of the company receives one or more guests at the premises of the company. At the reception point a visitor card (or the like), in which a transmitter is incorporated, is given to each visitor. The host employee of the company has a personal card, which in this embodiment must in principle incorporate its own transmitter. At the reception point the employee and his/her guests are connected into one group. If there is only one visitor, in this embodiment the visitor is not able to move on his/her own inside the company without the presence of the host employee. In this kind of embodiment for company premises preferably all the important doors and means of moving (e.g. elevators) are provided with identification points. If a guest e.g. tries to move on his/her own in an elevator without a host employee, movement or starting of the elevator can be prevented. Or if the visitor e.g. tries to move on his/her own inside the company, opening of the doors can be prevented. In both cases it is also possible to send to the tracking center information about the movement of the visitor. In this way it is known at which point the visitor tried to move without authorization. If there are more visitors than one, the same principles can apply as in the case of the one visitor presented above. In other words, all the visitors including the host employee must move as one group, in order for the group to be able to move inside the building. In some cases it is possible to allow (e.g. in certain parts of the building) that all the visitors do not necessarily need to be simultaneously with the host employee when moving around inside the company. In other words, in certain situations the host employee can move freely with a part of the clutch of visitors without special actions being performed.

In one embodiment of the invention one or more of the transmitters is affixed to something other than a person. In one embodiment the employee of the company can himself/herself manage, e.g. via his/her own computer or via the internal information network of the company, which appliance he/she wants connected to himself/herself. For example, an employee can want a transmitter affixed to his/her portable computer and the individualized identifier data of the transmitter of the portable computer logically connected to the individualized identifier data of the transmitter incorporated in the personal card of the employee. This kind of connection enables, say, that if the employee leaves the building unintentionally without his/her portable computer, the employee receives some kind of indication of this. The indication can be an auditive message at the door ("You forgot your computer."), visual feedback (text on a display screen about forgetting the computer), a signal lamp, a message to the mobile phone of the employee, etc. The system can additionally be implemented in the way that the aforementioned indication is given only at certain pre-defined identification points, e.g. only at the location of the outer doors of the building. The solution presented above can be implemented if necessary in a specific room in accordance with FIG. 3 or FIG. 4. In this case e.g. an identification point can be arranged in connection with the door of an employee, which operates as an independent unit. The identification point can, if so desired, be connected to the information network of a company to facilitate configuration, and the configuration rights for the identification point are arranged for only the person working in the room.

In one embodiment of the invention the system of the invention is applied in a hospital or a senior citizens' home. A transmitter is fastened to the patient or to his/her clothing. Likewise, the personnel of the hospital or the senior citizens' home each have their own transmitter. Information is arranged in the memory of the tracking center about those persons (e.g. nurses or doctors) with whom a patient may move around in the building or to the pre-defined extent. For example, in the environment of a senior citizens' home it is not at all unusual that dementia patients may leave the senior citizens' home alone without the nursing personnel noticing. With the solution according to the invention these kinds of events can be prevented. If a resident of a senior citizens' home who is carrying a transmitter tries to leave the senior citizens' home without the presence of one or more nurses, the outer door that is normally open of the senior citizens' home can automatically be locked when it is detected in the identification point arranged in the proximity of the door that the resident is trying to leave the building alone. The nursing personnel simultaneously receive information about the exit location and about the resident trying to leave. Guests visiting the senior citizens' home can in a normal situation use the elevators and/or the doors freely, and only the movement of patients is restricted.

In one embodiment of the invention the invention is used at an airport. At the check-in the bag of the passenger can automatically be provided with a transmitter. Likewise the passenger is provided with his/her own transmitter. The transmitter of the passenger can be in the plane ticket or perhaps be pre-installed in a customer loyalty card or it can be affixed to the clothing of the passenger. Further, at the check-in the passenger and his/her suitcase are logically connected by connecting the individualized identifier data of the transmitters. If the passenger e.g. moves past an identification point with the wrong suitcase, the passenger can, if so desired, be stopped and it can be checked whether the bag is really his/her own or e.g. the bag of another member of the family.

In one embodiment of the invention (e.g. in the system presented in FIG. 2) it is possible to set a "super-user", with whom any object whatsoever that is provided with a transmitter can move freely without performance of one or more of the aforementioned feedback actions. The super-user can be e.g. an employee for the identification point of a company, a guard for a shopping center or the like.

In the embodiment presented above a solution based on RFID technology is used as an example of an implementation. It is obvious to a person skilled in the art that the connection between the identification point according to the invention and the object can be implemented also with any other transmission technology whatsoever, e.g. with Bluetooth technology, etc.

The means used in the embodiments of the invention presented above, e.g. the management means and the determination means, can be implemented in a manner known to a person skilled in the art. The implementation can incorporate an implementation of a processor, a programmed processor, a computer, a memory, one or more software programs and or some other software or hardware implementation.

The invention is not limited solely to the embodiments described above, but instead many variations are possible within the scope of the inventive concept defined by the claims below.

The invention claimed is:

1. A method for tracking objects of people in a tracking system, the method comprising:
providing each of at least two different objects with a transmitter, each of the transmitters having individualized identifier data;
logically connecting the objects to each other by connecting the identifier data of the transmitters to each other;
recording the identifier data of the transmitters of the objects that are logically connected to each other in a memory;
connecting contact information of the object in question to the identifier data of the transmitter of the object;
detecting the transmitter of the object with a receiver of an identification point when the object comes close to the identification point;
determining based on the identifier data contained in the memory whether at least two objects that are logically connected to each other have traveled past the identification point inside a pre-defined time window; and
performing one or more pre-defined feedback actions when at least two of the objects that are logically connected to each other have not traveled past the identification point inside the pre-defined time window.

2. The method according to claim 1, further comprising:
defining one of the objects as the host object.

3. The method according to claim 1, further comprising:
defining a super-user in the tracking system;
permitting an object to travel past an identification point with the super-user without performance of one or more of the pre-defined feedback actions.

4. The method according to claim 1, further comprising:
recording the contact information in the memory.

5. The method according to claim 1, wherein the contact information is a phone number or other contact address.

6. The method according to claim 1, wherein the pre-defined feedback action comprises one or more of the following:
conveying information about the identification point to a tracking center;
presenting visual and/or auditive feedback;
sending a message to the contact information connected to the identifier data of the transmitter of the object;
forming a phone call to the contact information connected to the identifier data of the transmitter of the object;
recording the information in the identification point;
preventing starting of an elevator car, and
locking an exit passage.

7. The method according to claim 1, wherein in the determining step,
determination is performed based on the identifier data recorded in advance in the memory of the identification point.

8. The method according to claim 1, wherein in the determining step,
information about the identifier data that are logically connected to each other is received from the memory of the transmitter; and
determination is performed based on the identifier data received from the transmitter of the object.

9. The method according to claim 1, wherein in the determining step,
the identifier data that are logically connected to each other are retrieved from a centralized memory based on one or more identifier data; and
determination is performed based on the data received from the centralized memory.

10. The method according to claim 1, wherein the object is a person, an animal, an electronic device, an item of clothing, a bag, a travel document, an article or a toy.

11. The method according to claim 1, wherein the transmitter is a radio frequency remote identifier and/or a wireless short-range radio transmitter.

12. A system for tracking objects in a tracking system, the system comprising:
at least two transmitters, each of which has individualized identifier data,
a memory, which is arranged to record the identifier data of the transmitters of the objects that are logically connected to each other;
management means, which is arranged to logically connect objects to each other by connecting the identifier data of the transmitters of the objects to each other in the memory;
management means, which is arranged to connect contact information of the object in question to the identifier data of the transmitter of the object;
at least one identification point, which comprises a receiver for receiving the identifier data of the transmitter of an object, when the aforementioed object comes close to the identification point;

determination means, which is arranged to determine based on the identifier data contained in the memory whether at least two objects that are logically connected to each other have traveled past the identification point inside a pre-defined time window; and feedback means, which is arranged to perform one or more pre-defined feedback actions, when two of the objects that are logically connected to each other have not traveled past the identification point inside the pre-defined time window.

13. The system according to claim 12, wherein:
the management means is arranged to set one of the objects as the host object.

14. The system according to claim 12, wherein:
the management means is arranged to set a super-user in the tracking system and to permit an object to travel past an identification point with the super-user without performance of one or more of the pre-defined feedback actions.

15. The system according to claim 12, wherein:
the memory is arranged to record the contact information.

16. The system according to claim 12, wherein the contact information is a phone number or other contact address.

17. The system according to claim 12, wherein the pre-defined feedback action comprises one or more of the following:
convening information about the identification point to a tracking center;
presenting visual and/or auditive feedback;
sending a message the contact information connected to the identifier data of the transmitter of the object;
forming a phone call to the contact information connected to the identifier data of the transmitter of the object;
recording the information is recorded in the identification point;
preventing stating of an elevator car, and
locking an exit passage.

18. The system according to claim 12, wherein:
the determination means is arranged in the identification point to perform determination based on the identifier data recorded in the memory of the identification point.

19. The system according to claim 12, wherein:
the memory is arranged in the transmitter of the object; and
the determination means is arranged in the identification point to perform determination based on the identifier data received from the transmitter of the object.

20. The system according to claim 12, wherein:
the identification point is arranged to retrieve from a centralized memory the identifier data that are logically connected to each other on the basis of one or more identification data; and
the determination means is arranged in the identification point.

21. The system according to claim 12, wherein:
the identification point is arranged to convey the identifier data of a transmitter of an object to a tracking center; and
the determination means is arranged in the tracking center and they are arranged to perform determination based on the identifier data recorded in a centralized memory.

22. The system according to claim 12, wherein:
the identification point is arranged to convey one or more identifier data of a transmitter of an object and the identifier data that are logically connected to each other received from a transmitter to a tracking center; and
the determination means is arranged in the tracking center and they are arranged to determine based on the data received from an identification point whether at least two objects that are logically connected to each other have traveled past the identification point inside the pre-defined time window.

23. The system according to claim 12, wherein the object is a person, an animal, an electronic device, an item of clothing, a bag, a travel document or a toy.

24. The system according to claim 12, wherein the transmitter is a radio frequency remote identifier and/or a wireless short-range radio transmitter.

* * * * *